(12) United States Patent
Lugg

(10) Patent No.: US 8,453,961 B2
(45) Date of Patent: Jun. 4, 2013

(54) SUPERSONIC AIRCRAFT WITH SHOCKWAVE CANCELING AERODYNAMIC CONFIGURATION

(76) Inventor: Richard H. Lugg, Falmouth, ME (US)

( * ) Notice: Subject to any disclaimer, the term of this patent is extended or adjusted under 35 U.S.C. 154(b) by 207 days.

(21) Appl. No.: 12/893,489

(22) Filed: Sep. 29, 2010

(65) Prior Publication Data

US 2011/0133021 A1 Jun. 9, 2011

Related U.S. Application Data

(60) Provisional application No. 61/246,808, filed on Sep. 29, 2009.

(51) Int. Cl.
*B64C 1/00* (2006.01)

(52) U.S. Cl.
USPC ............... 244/13; 244/1 N; 244/119; 244/120

(58) Field of Classification Search
USPC .................... 244/13, 1 N, 119, 120
See application file for complete search history.

(56) References Cited

U.S. PATENT DOCUMENTS

| | | | | |
|---|---|---|---|---|
| D202,311 S | * | 9/1965 | Rellis | D12/337 |
| 3,279,725 A | * | 10/1966 | Gustav et al. | 244/191 |
| D213,528 S | * | 3/1969 | Rellis | D12/332 |
| 3,447,761 A | * | 6/1969 | Wadleigh et al. | 244/15 |
| 3,478,989 A | * | 11/1969 | Bielefeldt Ernst-August | 244/218 |
| 3,647,160 A | * | 3/1972 | Alperin | 244/1 N |
| 3,655,147 A | * | 4/1972 | Preuss | 244/1 N |
| 3,709,446 A | * | 1/1973 | Espy | 244/1 N |
| 3,737,119 A | * | 6/1973 | Cheng | 244/1 N |
| 3,776,489 A | * | 12/1973 | Wen et al. | 244/1 N |
| 4,114,836 A | * | 9/1978 | Graham et al. | 244/1 N |
| 4,483,497 A | * | 11/1984 | Rethorst | 244/15 |
| 4,598,886 A | * | 7/1986 | Friebel et al. | 244/15 |
| 4,691,879 A | * | 9/1987 | Greene | 244/45 R |
| 4,828,204 A | * | 5/1989 | Friebel | 244/15 |
| 5,251,846 A | * | 10/1993 | Rethorst | 244/15 |
| 5,322,242 A | * | 6/1994 | Tracy | 244/36 |
| 5,348,256 A | * | 9/1994 | Parikh | 244/208 |
| 5,358,156 A | * | 10/1994 | Rethorst | 244/15 |
| 5,538,201 A | * | 7/1996 | Gerhardt | 244/204 |
| 5,676,333 A | * | 10/1997 | Rethorst | 244/15 |
| 5,740,984 A | * | 4/1998 | Morgenstern | 244/1 N |
| 5,842,666 A | * | 12/1998 | Gerhardt et al. | 244/15 |
| 5,897,076 A | * | 4/1999 | Tracy | 244/117 A |
| D417,184 S | * | 11/1999 | Hartmann et al. | D12/333 |
| 6,070,831 A | * | 6/2000 | Vassiliev et al. | 244/120 |
| D428,381 S | * | 7/2000 | Hartmann et al. | D12/332 |
| D471,854 S | * | 3/2003 | Rouleau et al. | D12/319 |
| 6,698,684 B1 | * | 3/2004 | Henne et al. | 244/1 N |
| 6,854,687 B1 | * | 2/2005 | Morgenstern et al. | 244/15 |
| 6,857,599 B2 | * | 2/2005 | Tracy et al. | 244/45 A |
| 6,921,045 B2 | * | 7/2005 | Chang et al. | 244/15 |
| 6,923,403 B1 | * | 8/2005 | Dizdarevic et al. | 244/13 |
| 7,162,859 B2 | * | 1/2007 | Franchet et al. | 60/204 |
| 7,309,046 B2 | * | 12/2007 | Makino | 244/130 |

(Continued)

*Primary Examiner* — Isam Alsomiri
*Assistant Examiner* — Assres H Woldemaryam
(74) *Attorney, Agent, or Firm* — Verrill Dana, LLP; Chris A. Caseiro

(57) ABSTRACT

Disclosed is a supersonic aircraft design having a single structural component that simultaneously joins the wings to the aircraft fuselage, the engines to the aircraft fuselage, and the wings to the engines, resulting in an airframe planform, which, in combination aerodynamic shaping and structural morphing technologies within the aircraft fuselage, enables the aircraft to be optimized to reduce sonic boom.

10 Claims, 9 Drawing Sheets

U.S. PATENT DOCUMENTS

| | | | |
|---|---|---|---|
| 7,726,609 B2 * | 6/2010 | Shmilovich et al. | 244/207 |
| 7,793,884 B2 * | 9/2010 | Dizdarevic et al. | 244/36 |
| 7,854,409 B2 * | 12/2010 | Dizdarevic et al. | 244/45 A |
| 8,074,924 B2 * | 12/2011 | Cros | 244/55 |
| 8,083,171 B2 * | 12/2011 | Henne et al. | 244/1 N |
| 2005/0178900 A1 * | 8/2005 | Quayle | 244/102 R |
| 2010/0043389 A1 * | 2/2010 | Conners | 60/204 |
| 2010/0163670 A1 * | 7/2010 | Dizdarevic et al. | 244/36 |
| 2010/0224735 A1 * | 9/2010 | Dizdarevic et al. | 244/45 A |
| 2011/0095137 A1 * | 4/2011 | Tracy et al. | 244/35 R |

* cited by examiner

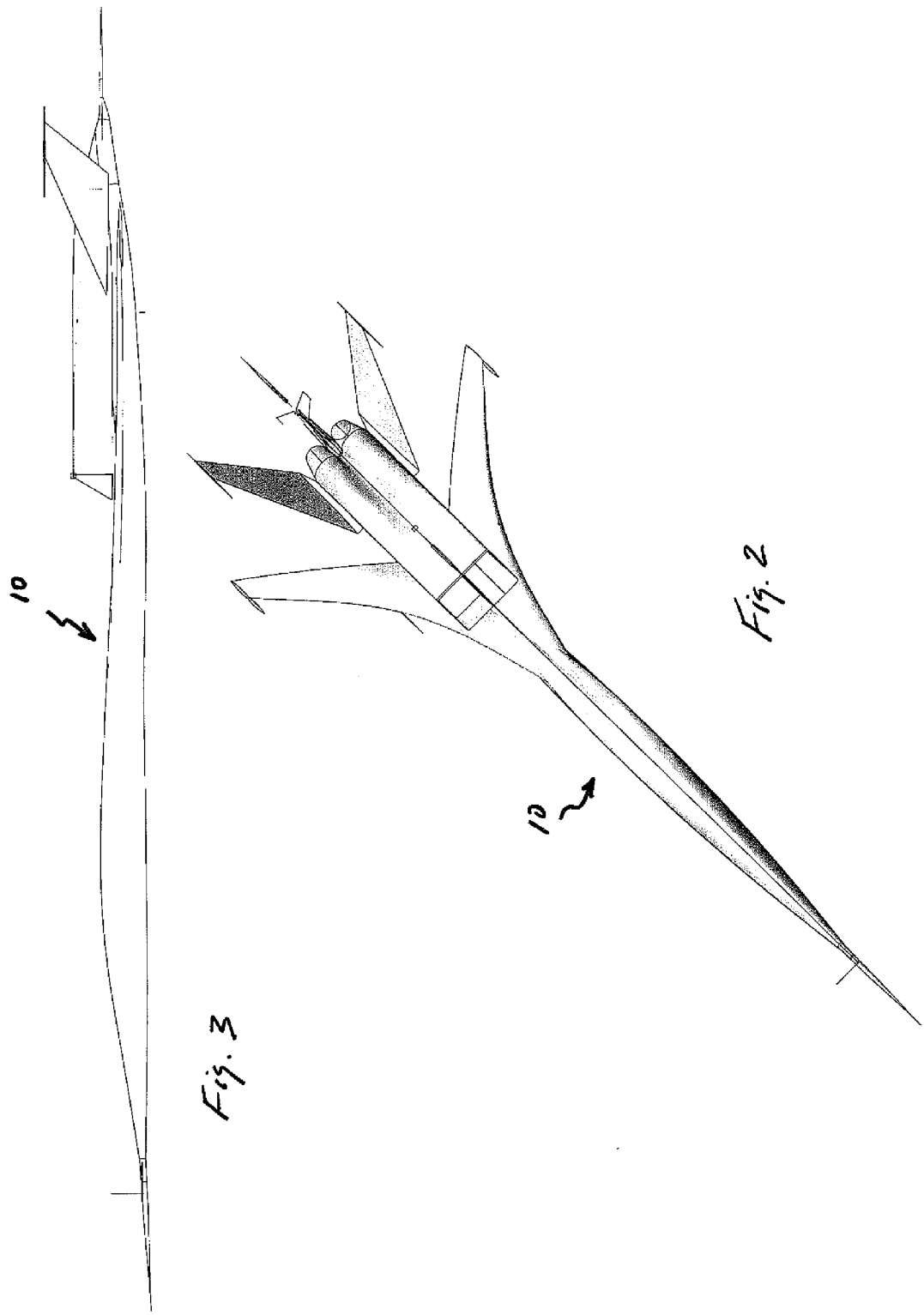

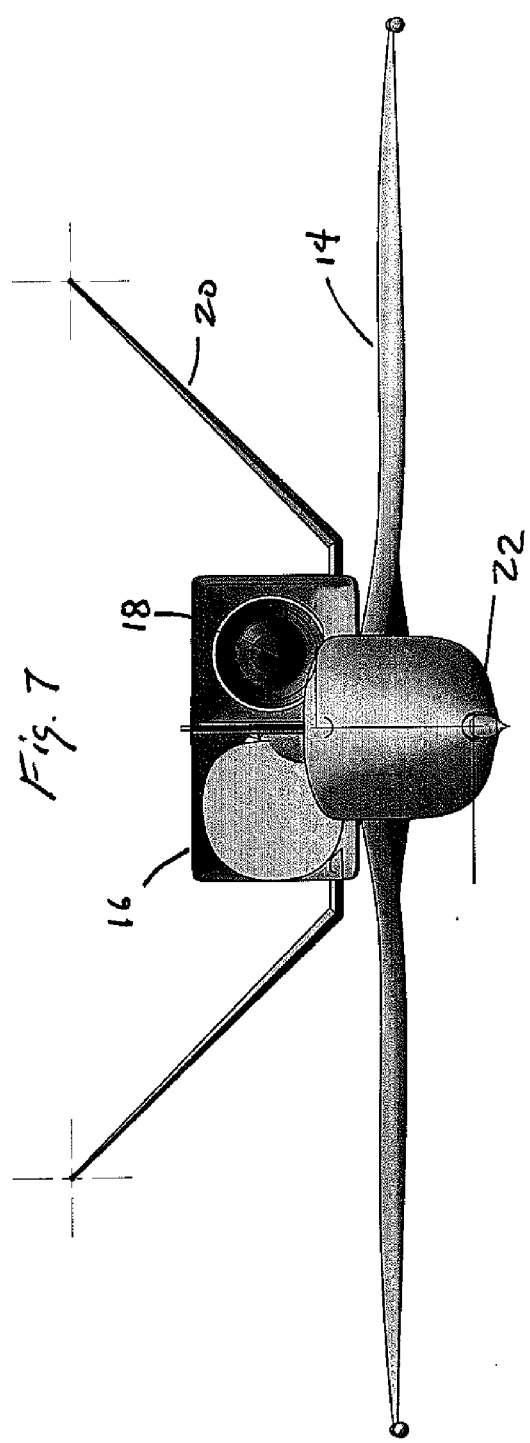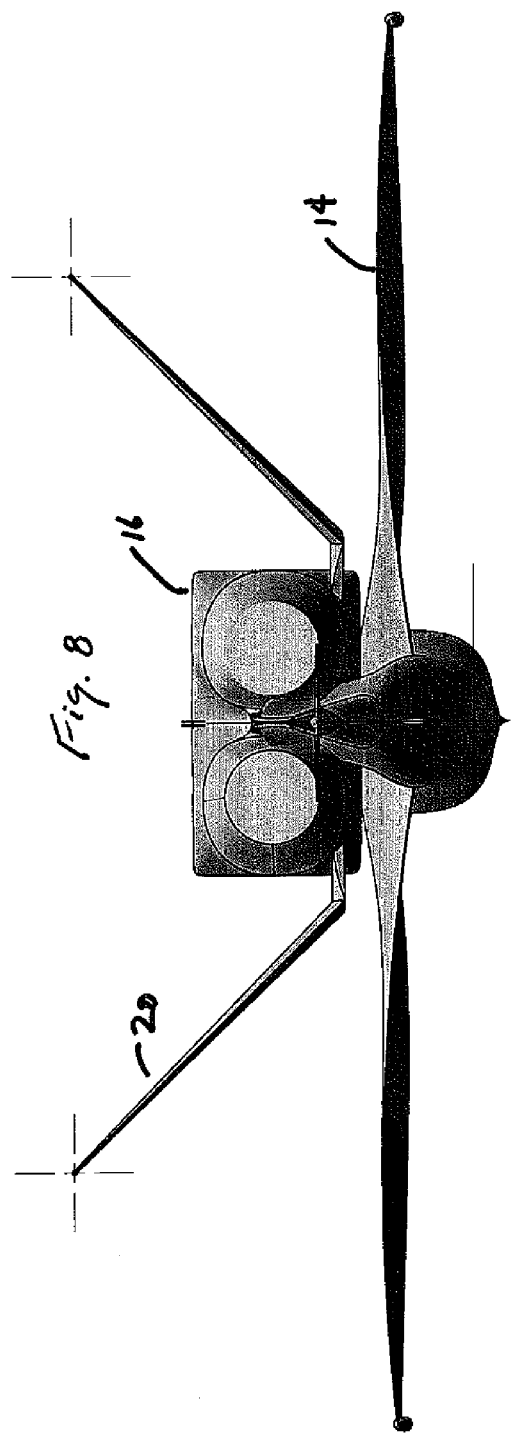

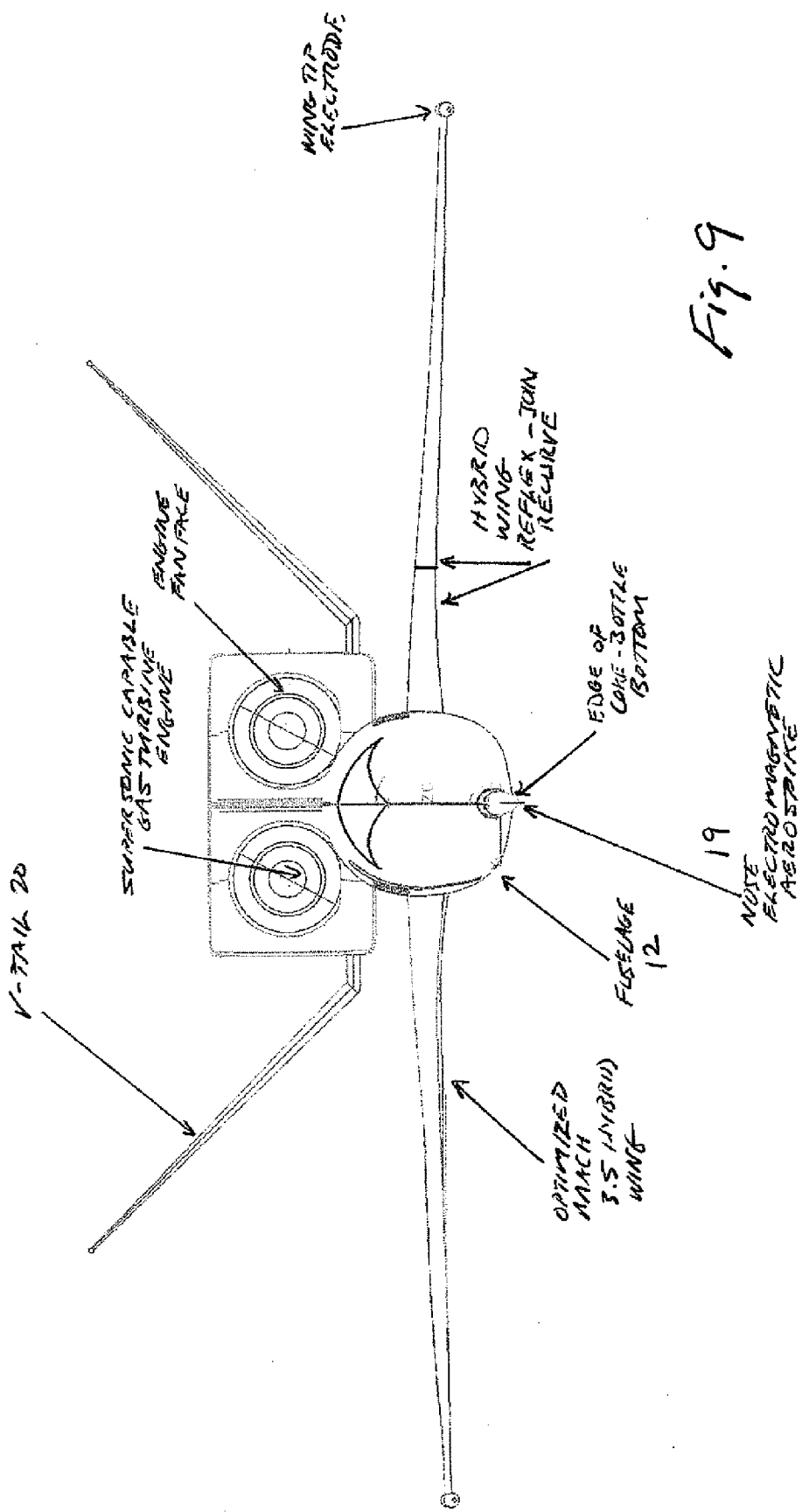

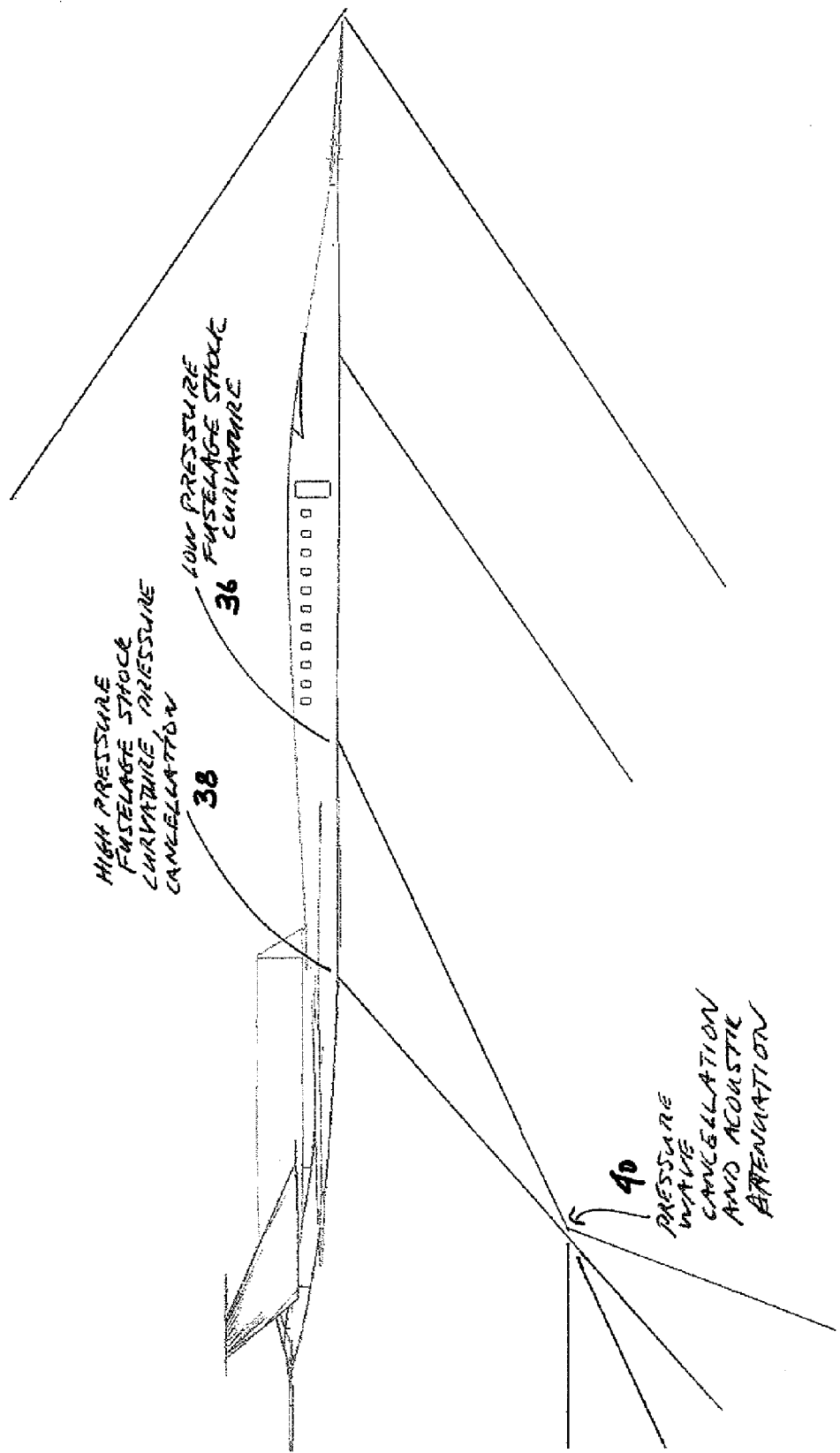

SUPERSONIC AIRCRAFT WITH SHOCKWAVE CANCELING AERODYNAMIC CONFIGURATION

CROSS-REFERENCE TO RELATED APPLICATIONS

This application claims priority to co-pending U.S. Provisional Application Ser. No. 61/246,808 filed Sep. 29, 2009 and entitled QUIET HYBRID ELECTRIC SUPERSONIC CIVIL TRANSPORT (QHESCT) AERODYNAMIC AIRCRAFT, which is incorporated by reference herein in its entirety for all purposes.

FIELD OF INVENTION

The subject disclosure relates to supersonic aircraft and, more particularly, to a Quiet Hybrid Electric Supersonic Civil Transport (QHESCT) for carrying passengers at very high flight speeds and Mach numbers.

BACKGROUND

Effective and practical high speed flight performance in commercial aircraft is very difficult to achieve both in a pragmatic sense and in the superlative sense from the position of passenger comfort and thus a successful business model to benefit profitability.

High speed flight requirements are demanding on aircraft with flight missions and design envelopes which exceed Mach 1.0 and doubly difficult when the design requires speeds above Mach 2.0 simultaneously with effective ranges. As speeds rise in aircraft designs to trim flight times over long ranges, in consideration of speeds in excess of Mach 3.0 and service ceilings above 50,000 feet physical, effects on the airframe become problematic from aerothermodynamic heating, subsequently generated drag, and the heating of the airframe from the air in which the aircraft is passing through. Drag increases at the cube of the speed, that is, as speed doubles, drag increase at a three-fold rate. Simultaneously, aircraft designed to travel at these speeds generate shock waves from the nose rearward of the aircraft. These shock waves form in trains, propagating to the ground causing sonic booms.

Research and development in aircraft configurations for very high speed flight has been conducted by major international institutes and aircraft companies over the years, but none have addressed the benefits of flight speeds to be sustained at Mach 3.5, or higher, nor the technical challenges required to be addressed to successfully overcome the challenges of flying at these speeds over a sustained period, or the additional aerodynamic technical challenges of approach and landing when the same high speed configuration must be able to fly close to stall and high angles of attack so as to arrest on commercial runways (typically 1.5-2 miles in length, 7000-10,000 ft.).

Accordingly, a need exists for an aircraft which can maximize aerodynamic performance, efficiency and comfort while carrying passengers over long distances at very high flight speeds and Mach numbers.

SUMMARY OF THE INVENTION

Disclosed is a Quiet Hybrid Electric Supersonic Civil Transport (QHESCT) and its unique structural, geometrical, mechanical and aerodynamic configuration designed to maximize aerodynamic performance, efficiency and comfort while carrying passengers over long distances at very high flight speeds and Mach numbers, and at low flight speeds upon approach and landing. The QHESCT design has numerous configuration and aerodynamic advantages, including a hybrid aerodynamic double delta supersonic laminar flow wing design, which makes the design novel in its achievement of successful operational speeds above Mach 3.5, and below Mach 0.3 on approach to landing.

According to one aspect of the disclosure, an aircraft apparatus capable of reaching supersonic speeds comprises: a fuselage comprising (i) a nose tip at an end of the fuselage; (ii) a first portion of the fuselage aft of the nose tip and characterized by a first curvature profile producing a first shock wave as the aircraft approaches supersonic speeds; and (iii) a second portion of the fuselage aft of the first portion of the fuselage and characterized by a second curvature profile producing a second shock wave as the aircraft approaches supersonic speeds, the second shock wave having greater pressure than the first shock wave. In one embodiment, the second shock wave at least partially attenuates the magnitude of the first shock wave. In another embodiment, the aircraft apparatus of claim 1 wherein the first and second portions of the fuselage are disposed on a bottom portion of the aircraft fuselage. In another embodiment, the curvature profile of the first portion of the fuselage is characterized by a concave surface while being the curvature profile of the second portion of the fuselage is characterized by a convex surface.

According to another aspect of the disclosure, an aircraft apparatus capable of reaching supersonic speeds comprises: A) a main fuselage; B) a pair of main wings attached to the main fuselage, the wings having a center of wing mass relative to the main fuselage, a mean aerodynamic chord, and an overall wetted surface area; wherein the center of wing mass, mean aerodynamic chord, and the overall wetted surface area of main wings are aft of a center of gravity of the aircraft.

According to a third aspect of the disclosure, An aircraft apparatus capable of reaching supersonic speeds comprises: a fuselage comprising: (i) a nose tip at an end of the fuselage and producing a first shock wave as the aircraft approaches supersonic speeds; and (ii) a first portion of the fuselage aft of the nose tip and producing a second shock wave as the aircraft approaches supersonic speeds, wherein second shock wave at least partially attenuates the pressure magnitude of the first shock wave.

BRIEF DESCRIPTION OF THE DRAWINGS

The above and further advantages of the invention may be better understood by referring to the following description in conjunction with the accompanying drawings in which:

FIG. 2 is solid surface perspective view of the aircraft illustrated in FIG. 1;

FIG. 3 is a side view of the aircraft illustrated in FIG. 1;

FIG. 7 is a solid surface front end view of the aircraft illustrated in FIG. 2;

FIG. 8 is a solid surface rear end view of the aircraft illustrated in FIG. 2;

FIG. 9 is a front end view of the aircraft illustrated in FIG. 1;

FIG. 10 is a side view of the aircraft illustrated in FIG. 1 illustrating shock wave geometries;

DETAILED DESCRIPTION

Figure 1:
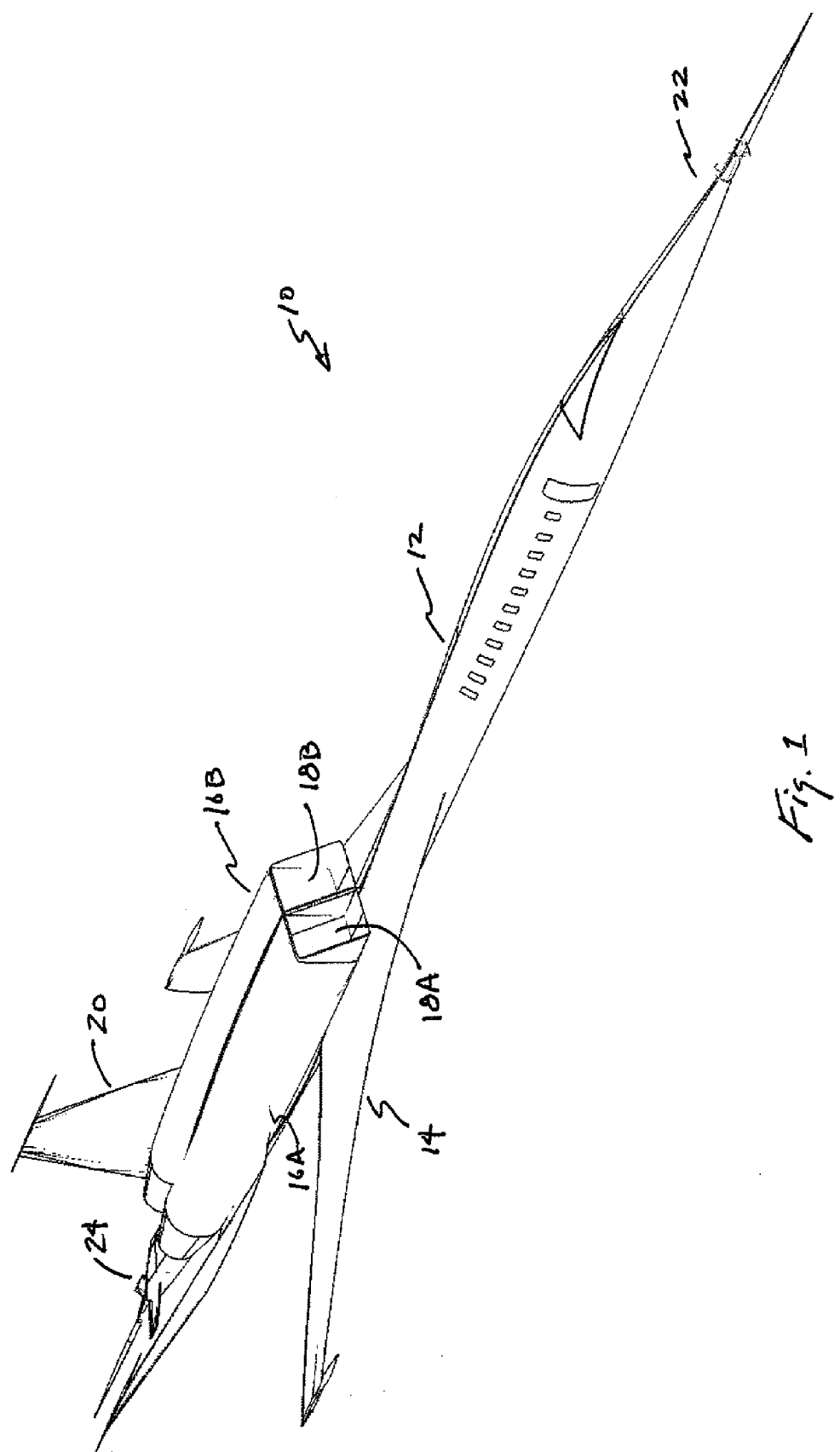
FIG. 1 is a perspective view of a Quiet Hybrid Electric Supersonic Civil Transport (QHESCT) aircraft in accordance with a disclosed embodiment.

QHESCT aircraft disclosed herein is a monoplane jet aircraft design with the unique features. Referring to FIGS. 1-13, and FIG. 1, specifically, a mid-wing supersonic monoplane, referred to hereafter as aircraft 10, comprises a main fuselage 12, having highly swept double delta wing 14 with a parabolic leading edges, and saddle mounted nacelles 16A-B and engines 18A-B, with center of mass ahead of the MAC of wing 14. Wing 14 has a highly swept supersonic wing design, specific to and with aerodynamic coefficients of efficiency for flight above Mach 3.5, with a center of the wing mass (WM), mean aerodynamic chord (MAC) and overall wetted surface area (WSA) of the wing located behind the center of gravity of the entire vehicle 10. Additionally, the highly swept wing 14 is such in its geometric planform for sustained flight, at or above Mach 3.5, that the root chord to tip chord ratios exceeds 6.0. This has always thought to be impossible due to reduced swept area drag and wave drag at high Mach numbers and not been done before or in a pragmatic sense, or has ever been achieved in flight surface design in practical flight vehicles, but is possible in the disclosed vehicle because of the novel geometry and planform of the V-tail or butterfly tail 20 aft of the main wing 14, which is set three wing chord root thicknesses above the centerline of the main wing 14. The V-tail 20 is configured so that it is not just a control and stabilizing surface, but also serves as a major lifting surface of the aircraft 10 and provides the basis by which that the main wing WM, MAC, and WSA can be behind the center of gravity of the entire aircraft and that the root chord to tip chord can be above Mach 3.0 (more typical geometric orders as observed in aircraft like the Concorde and the Aerion Corporation design). This configuration by mass weight, center of mass and wetted surface area of aircraft 10 provides a method by which the trim condition of the aircraft at Mach 3.5 and 80,000 feet (mass air density parameters incorporated) is minimized to zero-zero, and induced wave drag is eliminated. Although wave drag may still exist, at the design cruise condition, it is eliminated in the present design. This is due, in part, to the QHESCT planform design based on wing position and size and as it relates to position of the V-tail, its position and size and as the V-tail 20 being active as a lifting dynamic surface.

The highly swept wing 14 and V-tail 20 surfaces are sized to the specific surface area defined to maximize cruise efficiency at the design speed of Mach 3.5 at a 80,000 feet service ceiling. Cruise efficiency is described as the ratio of lift to drag whereby lift is maximized in the design and drag is minimized. Typically lift to drag ratios are seen in the range of 7:1, whereas in the QHESCT aircraft 10 design, lift to drag ratio is in the range of 11:1 to 12:1. This is possible because at design cruise the wing 14 holds an estimate for roughly 65% of the coefficient of lift which is then shared at 35% with the V-tail 20 to the rear. This is configured successfully by the V-tail having a chord to tip ratio of below 3:1. Such ratio is one root chord to tip chord ratio below other traditional supersonic designs because of: 1) its low drag coefficient, 2) the need for tail 20 to sustain some of the lifting mass requirements of the main wing, and 3) the requirement that tail 20 have a high wetted surface area to compliment the mass lift requirements not achieved by the wing 14 due to the high Mach cruise requirements.

The highly swept wing 14 is so configured geometrically that the parabolic leading edge is set at an average of 68 degrees aft sweep with trailing edge sweep set at 55 degrees sweep. The leading edge sweep varies from 74 degrees at the root to 66 degrees at the outer wing join (approximately two-thirds out in distance from the root toward the tip of the wing). The angle of sweep is set by achieving a lifting pressure at the design Mach speed, and at the design altitude, which compensates and overcomes the weight of the aircraft fully loaded at the cruise condition (the lifting pressure from the airfoil must exceed the negative weight of the aircraft at any given point in time). Also, the sweep angle is set so that the Mach cone angle, which is formed by the nose 22 of the aircraft penetrating the air at any given design cruise condition (i.e. the first shock wave), forms ahead of the leading edge of the wing. This is necessary so that a second shock cone or Mach angle (which increases drag) does not occur at the leading edge of the wing also. Hence, the Mach cone angle formed at the nose 22 creates the same aerodynamic condition (skin friction and wave drag) as is formed at the wing 14. Additionally, the average sweep angle of the wing which is delineated by the leading edge, is noted to have a continuous curvature and is not straight, such design being novel and unique in supersonic civil transport design. The curvature is to prevent constant build up of pressure and shock waves at Mach 3.5 and above from the oncoming freestream air behind the shock cone. Subsequently, the curved leading edge of the highly swept wing prevents undue pressure build up which can contribute to the decay of the lift to drag coefficients required for the design cruise condition and the fuel burn constraints needed to achieve specific range requirements of the aircraft at 6500 Nautical Miles (NM).

In one embodiment, the aircraft has a center of mass location approximately 104.23' from the nose behind the electromagnetic spike antenna, and a center of gravity of approximately 38.6%, referenced to mean aerodynamic chord.

Fuselage 12 is designed for high altitude operations. Main fuselage 12 defines a custom-luxury cabin and pilot deck, pressurized to 85,000 ft. The exterior of fuselage 12 may be implemented with structural sheet skins made of alloyed titanium 6.4V/2.8 Al, co-cured and co-bonded nano-carbon composite, or carbon-boron high temperature laminate composite skins. Doors may have aluminum structural cores covered with titanium skins. Wing 14 may be implemented with a titanium primary structure, an aluminum/titanium wing box, composite carbon-boron structural skins and panels, titanium nickel-cobalt alloy leading and trailing edges. Aircraft empennage may be implemented with composite internal primary and secondary structure, high temperature composite skins, titanium alloyed leading edges. Windows of the aircraft 10 may comprise FAA conforming carbon-acrylic ceramic glass. The interior of fuselage 12 may be designed for any of custom super luxury for the VIP executive class, government officials and diplomats, cargo and accessory compartments, heavy cargo, medical supply and cryogenic refrigeration capable, and even specialty and luxury high worth transport items capable such as thoroughbred race horses, cabin sized for this accommodation.

The aircraft 10 disclosed herein may have the performance as follows. Operational requirements for aircraft 10 are Hot and High altitude day condition (95 degrees Fahrenheit at 6500 feet above sea level) and 9500' runway requirement, Class 4 operational acoustics condition compatible. The operational speed of air craft is believed to be up to Mach 3.8, but limited thereafter due to aerothermodynamic heating and atmospheric conditions becoming of super-heated plasma species. Aircraft 10 may have a payload-range of 70,000 lb. fuel load, 15,000 lb. passenger and cargo load at 6500 NM. Aircraft 10 may have a cruise altitude of 81,000 ceiling at 12 PSI cabin pressurization; a cruise speed of Mach 3.5 at 81,000 feet; a cruise efficiency of 1.05 lbs. of fuel, per lb. of thrust, per hour; a climb performance of 7000 FPM, constant, 10,000 FPM maximum at fuel load at 6500 NM; a field performance at GTOW of 155,000 lbs. at 9,980 feet runway to clear a 50' obstacle, rotation at 225 Kts; an engine performance of Class 4 Stage under ICAO conditions; and an airport noise rating of Category 5 airport noise, as classified by EPA future aircraft environmental programs.

Aircraft 10 may have powerplant and fuel system, as follows. Engines 18 may be compatible with Jet-A, JP-4 and JP-7 fuel types. In one embodiment, engines 18 be implemented with fully integrated, hybrid supersonic/supercruise, non-afterburning engines which are Jet-A, JP-4 and JP-7 fuel capable. Aircraft and further implements electromagnetic drag reduction technology affording dramatic reduction/elimination of sonic boom below 0.25 lbs/sq.ft., overland Mach 3.0+ cruise. Engine and fuel control maybe digital and fiber optic full autonomous control and power systems hierarchical sensor systems architecture. Aircraft ignition may be electromagnetic superconducting pulse phase start and continuous pulse phase power in a ion plasma starter configuration. Engine indicating may be implemented with automated fiber optic control and display, flight deck sensor board and touch control indicating. Engine exhaust may be implemented with plasma accelerated control and thrust attenuation to supported electric supercruise at design Mach cruise conditions. Aircraft 10 utilizes magnetic levitation turbine engines, all electric aircraft and airframe, therefore reducing the need for oil on board the aircraft. Engine start up maybe achieved by ground start cart, conventional operating start conditions; airborne start capable upon necessity. Aircraft 10 utilizes a magnetic transmission and power transfer thereby eliminating the need for an accessory gearbox or main turbine shaft.

Aircraft 10 may utilize Avionics/Electrical systems as follows. Avionics suite may be implemented with: fly by light optic fiber; quad redundant. Autopilot maybe auto-on, 200' IFR and FLIR in communications may be implemented with VFIR technology. Electrical Power may be implemented with DC/AC power management rectifier and filter. Indicating/recording systems may utilize DDAS and SOCOM technologies. Aircraft lights may utilize standard and flight mode approach. Navigation may be implemented using VFR/GPS/Radar/SLIR technologies. Flight Controls may be implanted with quad-redundant all electric actuation and plasma actuator aerodynamic controls.

Other systems within aircraft 10 may be implemented as follows. Air conditioning may utilize environmental health controls of passengers through internal channeling of air conditioned air. A fire protection system may be certified to extend beyond FAA certification using aerogel fire protection blanket systems between outer skins, inner hull liners and structural spars and stringers. Ice and Rain protection may be implemented with heated leading edges and wing chord to limits of MAC at main spar of wing, MAC of V-tail, de-icing of ASWT at full chord panel structure and mount. Landing gear may be implemented with single double forward bogie on nose gear, swinging forward; triple axle, single bogie main gear rotating inward to central fuselage plane, all electric actuation. An onboard oxygen supply system may be implemented with on-board electric oxygenation generation generators, eight located above inner top hull lining covering air masses sufficient to cover 20 passengers and a crew of four.

Numerical Methodology of QHESCT Wing Aerodynamics

The curved, highly swept leading edge of the wing 14 also serves the purpose of supporting aerodynamic stability in low-speed high alpha flight, approach and landing speed conditions (high-alpha is high, nose-high flight conditions, approaching stall), as well as being optimized for high mach number flight, but carries a washout condition distal to the wing join to induce laminar flow near stall and promote a high lift condition (high lift to drag ratios—high lift, low drag) at design Mach cruise conditions. Beyond the outer wing join, although the curvature is continuous and described by a single algorithmic equation and bounded numerically by partial differential equations denoting airfoil shaping, and based on the functions of lift as in; velocity, air density, reference wing area, viscosity and the speed or sound such that lift=L where:

$$L = f(V_\infty, p, S, \mu, a_\infty)$$

A similar relationship exists for both the drag (D) and pitching moment (M) with these quantities further defining the transition of the outer wing panel aerodynamics for low speed approaching stall. In essence a hybrid aerodynamic condition exists where the performance and numerical analysis of the inner wing panel and geometric aerodynamics there perform in a low speed environment for a highly swept delta, and the aerodynamic condition of the inner wing delta functions in a higher speed airflow speed environment. This is best expressed with the parameter a∞N∞ which is the inverse of the Mach number, M∞. Here, as it relates to the aircraft configuration, the third quantity defining the hybrid wing environment is the Reynolds number.

$$Re = \frac{\rho V_\infty l}{\mu}$$

This Reynolds number numeric maybe further expressed in a simplified equation to the form of $$L \propto (\rho V_\infty^2) \left(\frac{1}{M_\infty}\right)\left(\frac{1}{Re}\right)_{/Re-M/pV2}$$

This is now defined as a variable hybrid lift coefficient equating the lift and Reynolds number between the low speed flight condition between the outer wing delta and the inner wing delta of aircraft 10.

A low Mach number model for the hybrid inner and outer wing deltas is more comprehensively derived from compressible flow equations based on asymptotic analysis in an algorithm expression for the Mach number |U|/c, where U is the fluid velocity and c is the speed of sound.

This analysis leads to a decomposition of the pressure, p(x,t)=p0(t)+_(x,t), where _/p0=O(M2), and the dynamic pressure, which is decoupled from the equation of state for the thermodynamic pressure, p0=p(O, T, Yk). In this limit, the algorithmic equations that are derived express mass, momentum and energy conservation simultaneously in a hybrid numeric environment which follows in practice the practical application of the highly swept double delta curved leading edge of wing line as follows:

$$\partial\_U$$

$$\partial t + r\_UU + r\_ = r\_ + \_F,$$

$$\partial Yk$$

$$\partial t + r\cdot\_UYk = \_l\cdot k + r\cdot Dk,$$

$$\partial\_h$$

$$\partial t + r\cdot(\_Uh) - dp0/dt = r\cdot q.$$

where D, U and h are the density, velocity and enthalpy, respectively, and Yk is the mass fraction of species k. Dk, and q are the diffusive fluxes of species, momentum and energy, and F represents an external mass flow of forces of a specific dynamic amplitude for any given point along the hybrid parabolic leading edge and sweep of the double delta wing 14.

It is known that shock waves and low Reynolds numbers effects distinct in-boundary layer separation, and subsonic flow, and approach stall acoustic waves. Thus there is a need to resolve them numerically, and it is in the above derived algorithmic equation of state which has completely removed the numeric effects of h, Yk and q as the diffusive fluxes of effects on boundary layer conditions approaching supersonic conditions on one end of the flight spectrum and above, but also bounds the opposed conditions at the other end of the flight spectrum close to stall, and then at stall; thus the equation of state constrains the evolution.

At very high Mach numbers, such as those to be observed by aircraft 10 and wing 14 in its aerodynamic configuration, the same algorithm evolutionizes through basic discretization, combining a symmetric operator-split treatment of air molecule chemistry and transport, as defined by a superheated condition where the air approaches an electromagnetic charged plasma, in and of its self, due to high temperatures of skin friction (in excess of 800 degrees Fahrenheit) at the leading edges of the wing 14 and V-tail 20 and nose 22 where, to constrain values of density, D, and enthalpy, h, the derivative of the mass fraction, Yk, is imposed over time to the degrading value of the super-heated air molecules as the air molecules adhere, and cause the skin friction at temperature upon the wing. To offset this value and reduce skin temperatures as the electromagnetic drag reduction technology provides impedance, and changes the kinetic charge of the air mass as it approaches gaseous state in the form of:

$$Dv/Dt(Yk) - h\{(p0(t) + \_(x,t)\}$$

Thus the algorithmic expression is re-defined in terms of velocity and density constrained by enthalpy and degradation of the laminar flow over time, t, due to super-heating and Mach number, M, from aerothermodynamic heating and friction, thus:

$$\partial\_U$$

$$\partial t + r\cdot\_UU + Ykr\_ = \{(Yk) - h\{(p0(t) + (x,t)\}/rt\_ + \_F,$$

where p0(t)+_(x, t) is the decompensation of the pressure over time $t_1$ and the effects of enthalpy applied to the mass fraction define the degradation of state of laminar flow for a particular laminar condition in the transition of mass air flow with EDRT on, and EDRT off, hence the physical and mechanical limits of the aerodynamic effects of the hybrid wing 14 are defined with a density-weighted approximate projection method to impose the evolution constraint. The resulting integration proceeds on the time scale of the relatively slow advective transport. Faster diffusion and chemistry processes are treated implicitly in time. This integration scheme is embedded in an adaptive mesh refinement algorithm based on a hierarchical system of rectangular grid patches.

Options for data distribution include a multi-grade algorithm, with an additional step to balance aerodynamic conditions with both constant volume and pressure, and velocity-ordering space-filling curves and apertures. The complete integration algorithm is second-order accurate in space and time, and discretely conserves velocity species, mass flow, and enthalpy.

For details of the low Mach number model for sake of discussion as it applies to near stall, or at stall conditions, and the hybrid wing design effects, its numerical implementation and affects on the hybrid double wing delta geometry, as a numeric model, are best exhibited as an ideal air flow equation of state, with explicit numerical integration of the compressible reacting flow equations as summation techniques to modeling the flows empirically. Thus the integration algorithm solves a multi-stage procedure involving a number of elliptic/parabolic solvers for each time step of velocity, mass density, enthalpy and compressible flow equations are analyzed, whether subsonic or supersonic aerodynamic flow conditions being present or not. This attributes to the numerical analysis as real world, real time and the integration algorithm becomes best suited to define the flow condition over any given time Dt/Dv (T) with the effects impeding of velocity species, mass density, and enthalpy constraining performance estimates of the hybrid double delta swept wing 14 design in a subsonic condition, above stall, or at a supersonic condition as in cruise.

Another unique and prominent feature of aircraft 10, concerning both the physical and mechanical aerodynamics technology, is the aft aerodynamic supersonic wing tailplane device 24 that reduces the pressure of the continuum of the shock cone from the front of the aircraft, such propagating shock waves passing the aircraft as the aircraft proceeds from breaking the sound barrier at Mach 1.0 on up to design cruise of Mach 3.5.

Figure 4:
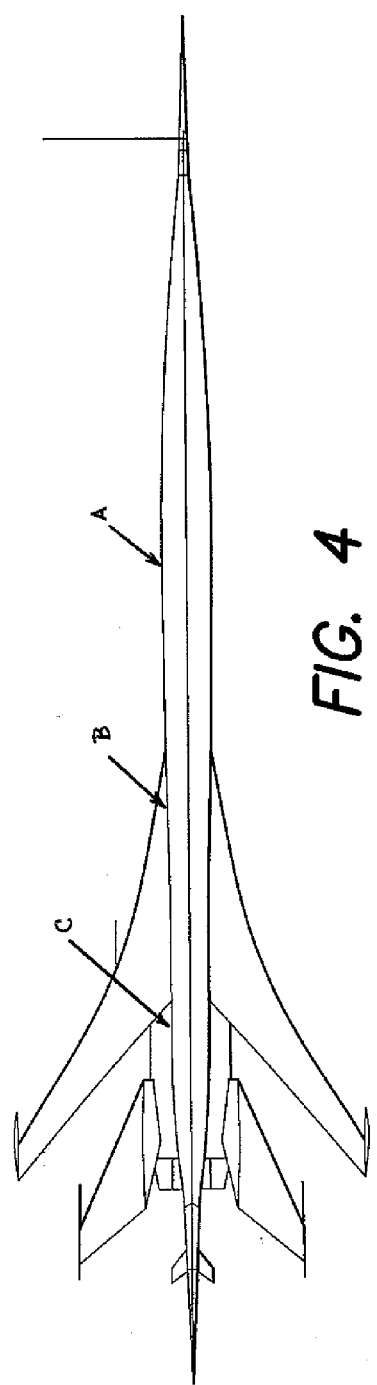
FIG. 4 is a bottom view of the aircraft illustrated in FIG. 1.
Figure 5:
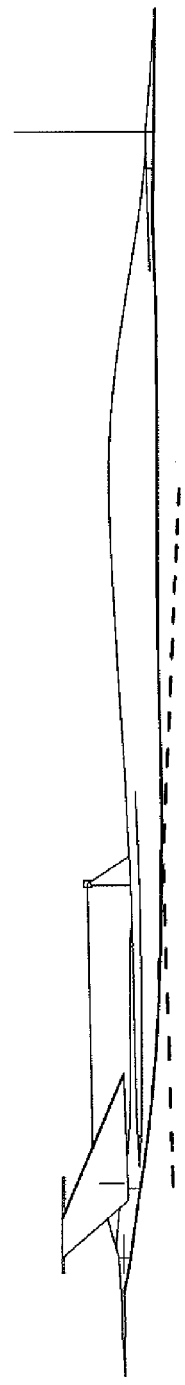
FIG. 5 is another side view of the aircraft illustrated in FIG. 1.
Figure 6:
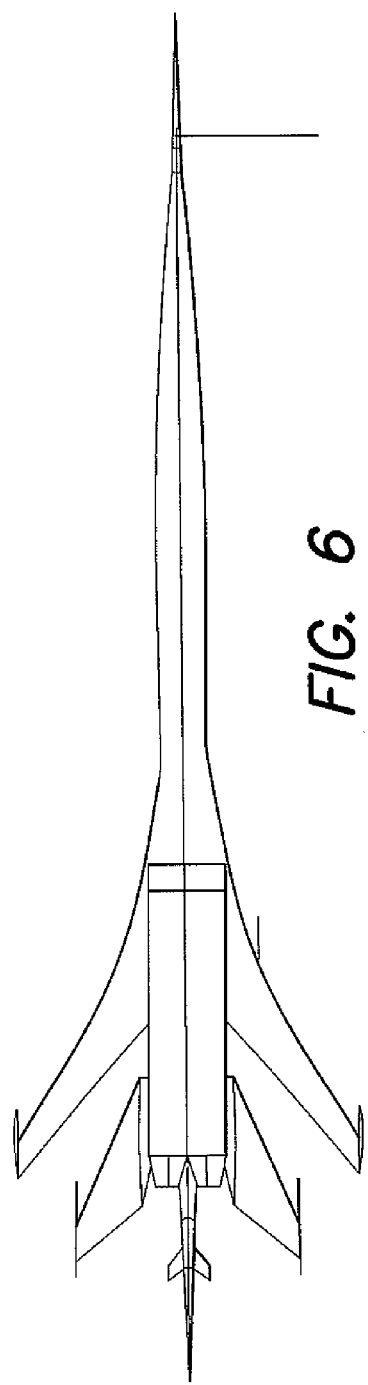
FIG. 6 is a solid surface top view of the aircraft illustrated in FIG. 2.

The rear aerodynamic supersonic wing tailplane (ASWT) 24 creates lift aft of the V-Tail 20 and essentially forms a pressure differential between the rear of aircraft 10 and the forward moment of the aircraft. ASWT 24 is sized so as to bring aircraft 10 up on step as in riding the forming shock wave in a "surfing" fashion, in the capacity of another aerodynamic shaping technology/device below the aircraft, featuring a coke-bottle shape 26, that is, a concave surface in sequence with a convex surface, profile at the bottom of the aircraft, running from the forward leading edge of the wing to the aft ASWT, which provides the method for the aircraft to hydroplane or "wave ride" the shock wave, forming as a bow wave at the nose of the aircraft, then propagating into an "N"-shaped shock wave, of which the second shock occurs below the exact point, mid-wing by chord, of the wing, below the aircraft, and the coke-bottle fuselage shape. This shape specifically in geometric terms is a radius forward and aft of the narrowest point of the fuselage as seen in FIG. 4. Where forward toward the nose it is at an approximate 12 degree radius and at a maximum width at Point A, and exemplifies, running aft an optimized condition of two to one (2:1) ratio, against a rearward finishing portion of the coke-bottle shape at Point C where the radius is 6 degrees, thus the defined ratio which provides a maximum reduction or attenuation in the shock wave with the least implication of the growth of wave drag from the coke bottle shape. This shape attenuates overall the N-Point of the second shock by pressure reduction through expanding the rising compression following reduction to the narrowest point of the fuselage at Point B, from the formed shock waves and with the ASWT bringing the fuselage "up on step", on the continuously forming second shock wave below the aircraft, ultimately at Mach ranges between Mach 1.8-3.5

Another unique aerodynamic shaping feature of the QHESCT aircraft configuration is the fully integrated-mated fuselage twin engine nacelle structure which reduces and stabilizes wave drag (a key contributor typically where removing the mounting of the engine nacelles from the rear fuselage, which normally reduces the expanding low to high pressure aerodynamic flow, and that this is a negative design consideration in supersonic flow conditions on supersonic aircraft), subsequently engines are overslung and integrated a-top of the rear fuselage in side-by-side nacelles, above the wing mating join, and attached via a massive composite keel structure to the central wing box. This composite keel structure is unique and novel in supersonic aircraft design and civil aircraft design in general, in that it simultaneously joins the wing 14 to the fuselage 12, and the engines 18 to the fuselage 12, and wings 14 to the engines 18, in a single structural component. These strategic locations of major lift and structural airframe assemblies provide aircraft 10 with a unique airframe planform that is optimized to reduce sonic boom physically, and in combination with, proprietary aerodynamic shaping and structural joining and morphing technologies within the aircraft structure (coke-bottle fuselage bottom and the aerodynamic supersonic wing tailplane 26), in addition to the electromagnetic drag reduction technology as described in United States Provisional Patent Application Entitled Quite Hybrid Electric Supersonic Civil Transport, by Richard H. Lugg, filed Mar. 26, 2009, provides a unique design for supersonic civil transport.

FIGS. 10-13 illustrate various aspects of the aircraft 10. In FIG. 10, a location along the main fuselage of low pressure the fuselage shock curvature is illustrated at point 36 while a location along the main fuselage of high pressure the fuselage shock curvature, resulting in pressure cancellation, is illustrated at point 38. The point of pressure wave cancellation of acoustic attenuation is illustrated at point 40.

Figure 11:
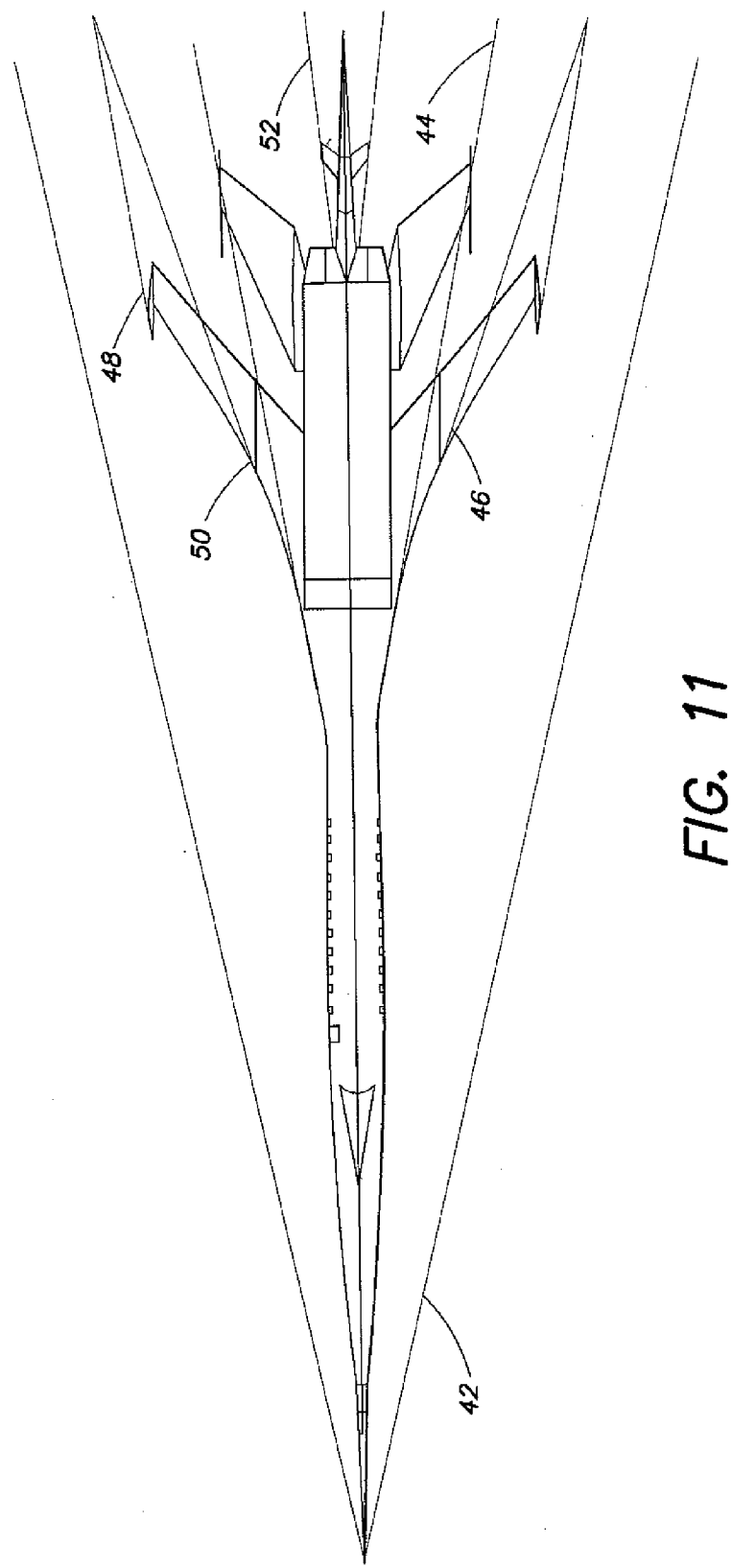
FIG. 11 is a top view of the aircraft illustrated in FIG. 1 illustrating I shock wave geometries.
Figure 12:
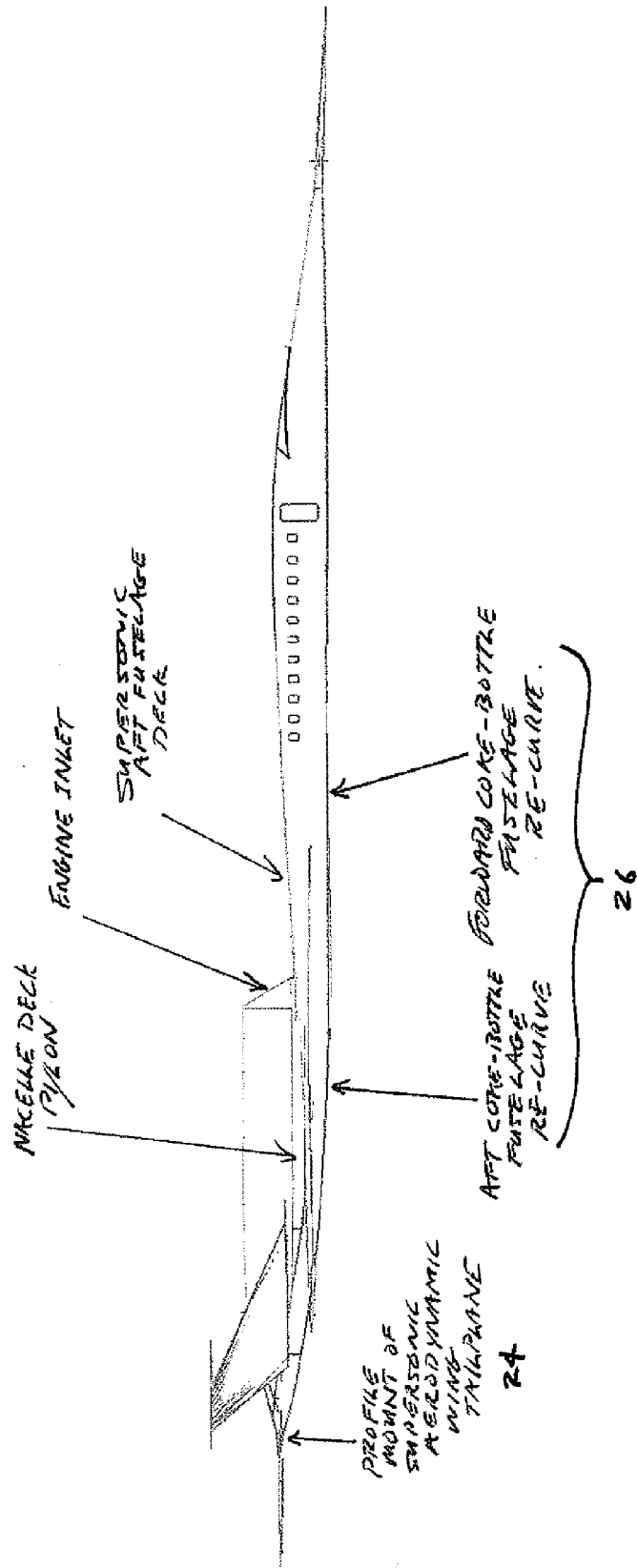
FIG. 12 is another side view of the aircraft illustrated in FIG. 1.
Figure 13:
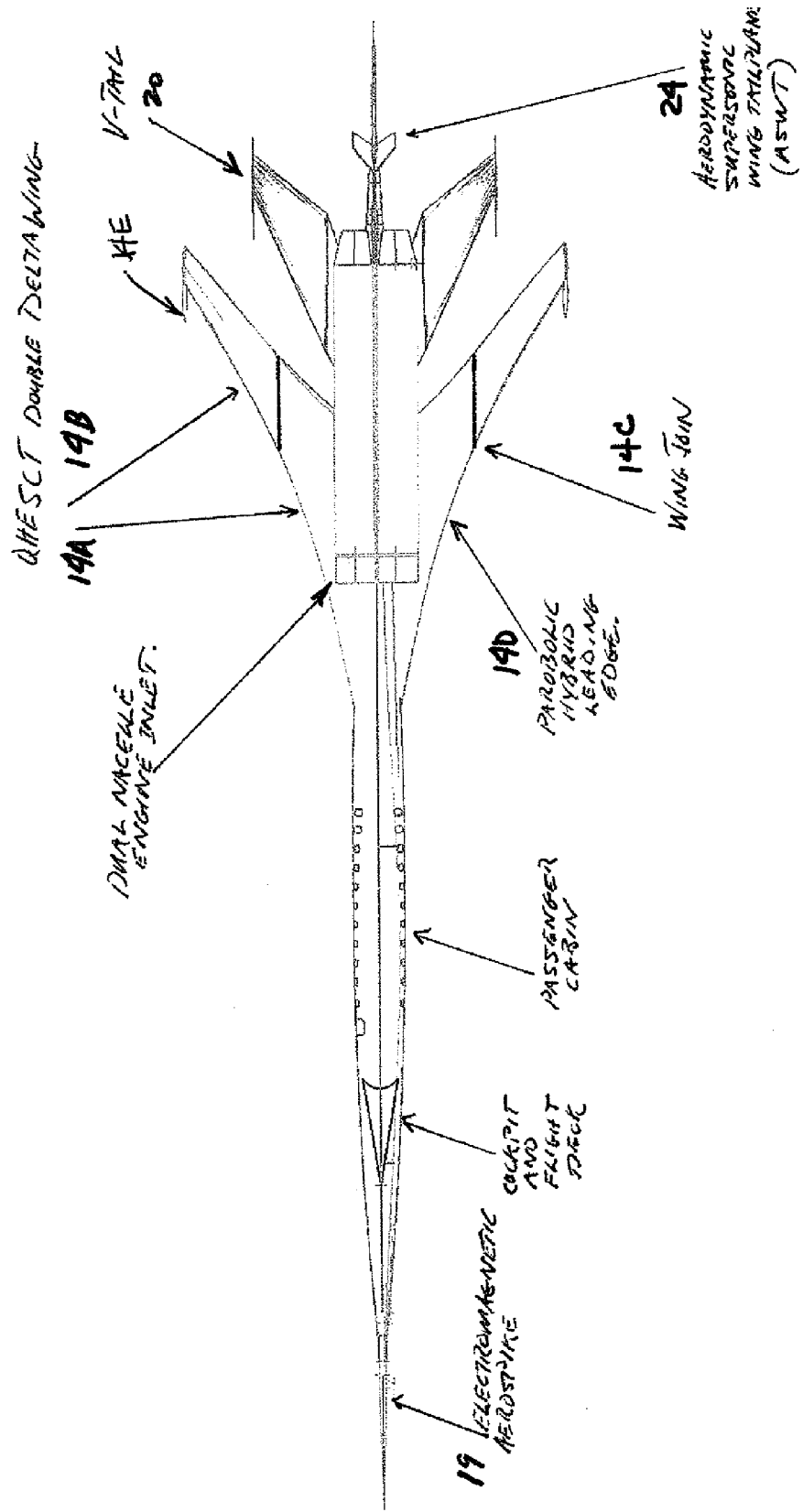
FIG. 13 is another top view of the aircraft illustrated in FIG. 1.

Additional shock generation geometries created by aircraft 10 are illustrated in FIG. 11. A primary bow shock wave 42 is generated by the nose of aircraft 10 while a secondary wing shock wave 44 is generated by the edge of wings 14 near fuselage 12. A third shock wave 46 is generated at the juncture 14C of wings sections 14A-B. A wing joint shock wave 50 occurs at lower speeds and at lower angle than the bow shock wave, accordingly, the pressure is attenuated due to shock wave Being manipulated by the hybrid wing airfoil. Another shockwave 48 is generated by the aft wing tip 14E. shock wave 52 is generated by the aft tailplane 24 which creates the greatest pressure causing the aircraft to come up on step above speeds of Mach 2.5 utilizing the wave and rider coke-bottle fuselage configuration described herein.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted.

What is claimed is:

1. An aircraft apparatus capable of reaching supersonic speeds comprising:
   A) a fuselage comprising:
      (i) a nose tip at a first end of the fuselage;
      (ii) a first portion of the fuselage aft of the nose tip and characterized by a first curvature profile producing a first shock wave as the aircraft approaches supersonic speeds; and
      (iii) a second portion of the fuselage aft of the first portion of the fuselage and characterized by a second curvature profile producing a second shock wave as the aircraft approaches supersonic speeds, the second shock wave having greater pressure than the first shock wave;
   B) a pair of main wings attached to the fuselage;
   C) a tail attached to the fuselage aft of the pair of main wings;
   D) aircraft engines;
   E) a tailplane aft of the aircraft engines having horizontal aerodynamic surface, fully located within the wake of the aircraft engines, and the tailplane is arranged to provide lift to the aircraft apparatus as well as reduce shock cone pressure.

2. The aircraft apparatus of claim 1 wherein the second shock wave at least partially attenuates the magnitude of the first shock wave.

3. The aircraft apparatus of claim 1 wherein the first and second portions of the fuselage are disposed on a bottom portion of the aircraft fuselage.

4. The aircraft apparatus of claim 1 wherein the curvature profile of the first portion of the fuselage is characterized by a concave surface.

5. The aircraft apparatus of claim 4 wherein the curvature profile of the second portion of the fuselage is characterized by a convex surface in sequence after the concave surface.

6. An aircraft apparatus having a center of gravity, wherein the aircraft apparatus is capable of reaching supersonic speeds comprising:
   A) a main fuselage;
   B) a pair of main wings attached to the main fuselage, the wings having a center of wing mass relative to the main fuselage, a mean aerodynamic chord and an overall wetted surface area;
   wherein the center of wing mass, the mean aerodynamic chord and the overall wetted surface area of the pair of main wings are aft of the center of gravity of the aircraft apparatus;
   C) aircraft engines;
   D) a tailplane aft of the aircraft engines having horizontal aerodynamic surface, fully located within the wake of the aircraft engines, and the tailplane is arranged to provide lift to the aircraft apparatus as well as reduce shock cone pressure.

7. The aircraft apparatus of claim 6 further comprising:
   E) a V-shaped tail section aft of the pair of main wings between the pair of main wings and the tailplane.

8. The aircraft apparatus of claim 7 wherein the main wings have a center line relative to the main fuselage and wherein the V-shaped tail section is set three wing chord root thicknesses above the center line of the main wings.

9. The aircraft apparatus of claim 6 wherein the main wings have continuously curved leading edges.

10. An aircraft apparatus capable of reaching supersonic speeds comprising:
    A) a fuselage comprising:
       (i) a nose tip at a first end of the fuselage and producing a first shock wave as the aircraft approaches supersonic speeds; and
       (ii) a first portion of the fuselage aft of the nose tip and producing a second shock wave as the aircraft approaches supersonic speeds,
    wherein second shock wave at least partially attenuates the pressure magnitude of the first shock wave;
    B) aircraft engines;
    C) a tailplane aft of the aircraft engines having horizontal aerodynamic surface, fully located within the wake of the aircraft engines, and the tailplane is arranged to provide lift to the aircraft apparatus as well as reduce shock cone pressure.

* * * * *